Jan. 13, 1931.                M. HERTZ                    1,789,232
                             DISH DRAINER
                          Filed Jan. 30, 1930
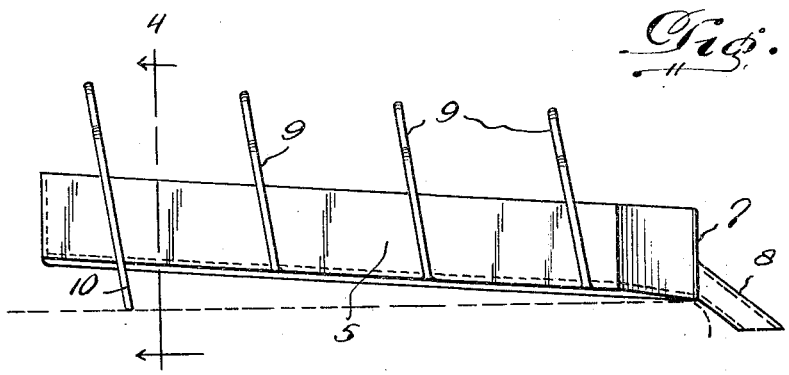
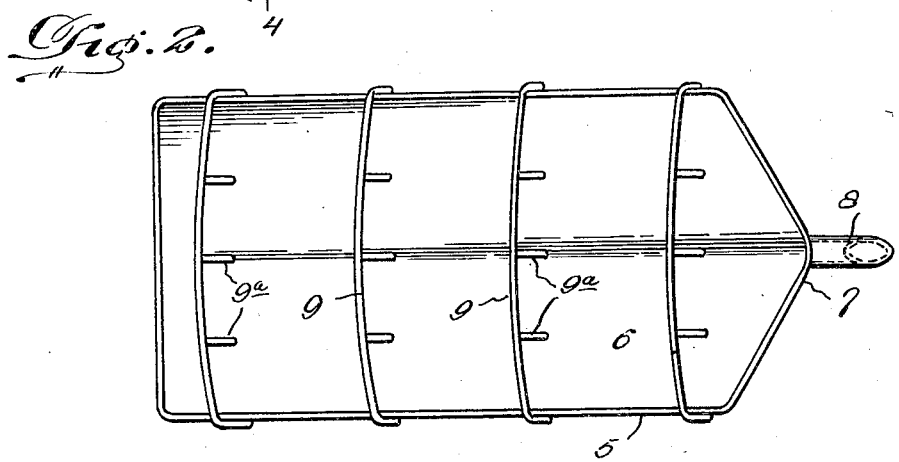
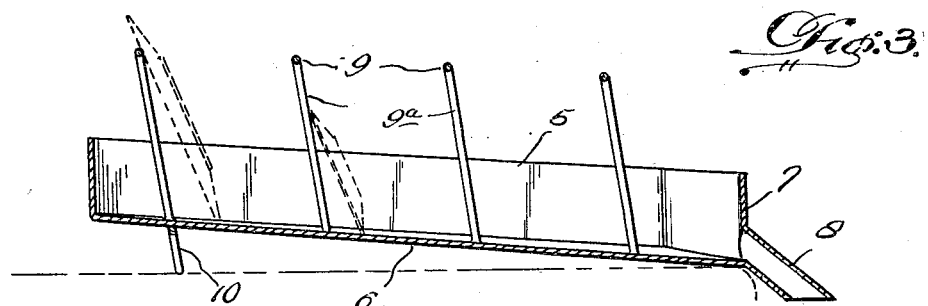
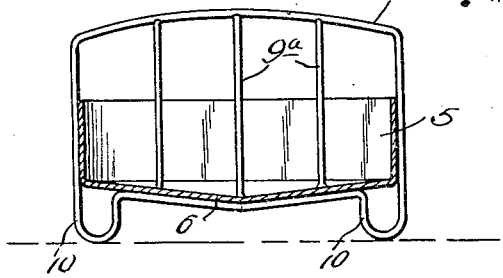
Mary Hertz,
INVENTOR.
BY J. Stanley Burch
ATTORNEY.

Patented Jan. 13, 1931

1,789,232

UNITED STATES PATENT OFFICE

MARY HERTZ, OF CLEVELAND, OHIO

DISH DRAINER

Application filed January 30, 1930. Serial No. 424,646.

The present invention relates to an improved dish drainer of the type which embodies a pan or tray adapted to receive wet dishes and having means to support the dishes so that the water will readily drain therefrom, means being provided to support the pan or tray at an inclination so that the water which drains from the dishes will flow to the lower end of said pan or tray, and the lower end of the pan or tray having an outlet spout through which the water may drain from the pan or tray directly into a basin, sink, or the like.

An object of the present invention is to provide a dish drainer of the above kind which is simple and durable in construction, efficient, sanitary and convenient to use.

A further object is to provide a dish drainer of the above type having improved means to support the dishes and to support the pan or tray at an inclination.

The invention consists in the novel form, combination and arrangement of parts hereinafter more fully described, shown in the accompanying drawing, and claimed.

In the drawing:

Figure 1 is a side elevational view of a dish drainer embodying the present invention.

Figure 2 is a top plan view thereof.

Figure 3 is a central longitudinal section of the same; and

Figure 4 is a transverse section on line 4—4 of Figure 1.

Referring in detail to the drawing, the present invention embodies an elongated pan or tray 5 having a bottom wall 6 which slopes laterally and downwardly from opposite sides of the tray to the longitudinal center thereof, thus providing, in effect, a central longitudinal channel into which the water from the dishes drains for readily running off into a sink or the like, as will presently become apparent.

One end of the tray tapers substantially to a point as at 7, and projecting from the lower central portion of this end is a depending spout 8 through which the water may run from the pan or tray into the sink, or the like.

A plurality of spaced transverse racks 9 are rigidly secured to the tray 5 for supporting the wet dishes in an upright position, within said pan or tray so that the water may readily drain from the dishes onto the bottom of the tray. Each dish supporting rack embodies an inverted U-shaped wire frame whose legs are soldered or welded at their lower ends to the sides of the tray, and spaced vertical bars 9a rigid with and depending from the intermediate portion of the frame to provide support for small saucers and the like.

To cause the water to flow toward the spout 8, the rack 9 nearest the opposite end of the tray has its legs formed with extensions that project below the bottom of the tray and are return-bent to form legs 10 adapted to rest on the drain board or other support for the drainer so that said opposite end of the tray will be elevated. The racks 9 are inclined in a direction opposite the inclination of the tray 5 so that the dishes will not readily fall when placed in the tray for draining, as indicated by dotted lines in Figure 3.

In use, the dishes are positioned in the tray transversely of the latter, and so as to rest against the racks 9 which project above the sides of the tray. A large number of dishes may thus be accommodated in a position so that the water will effectively drain therefrom. As the water falls onto the bottom of the tray, it readily drains to the center of the tray and quickly runs off through the spout 8 into the adjacent sink, or the like.

What I claim as new is:

1. A dish drainer comprising an elongated tray having means to support one end in an elevated position and provided with a bottom wall which slopes laterally and downwardly from opposite sides of the tray to the longitudinal center thereof, the other end of said tray being tapered and having a depending outlet spout projecting from the lower central portion thereof, and a plurality of spaced transverse dish supporting racks rigid with and projecting above the sides of said tray, one of said racks having feet-forming extensions constituting said means to support one end of the tray in an elevated position.

2. A dish drainer comprising an elongated tray having means to support one end in an elevated position and provided with a bottom wall which slopes laterally and downwardly from opposite sides of the tray to the longitudinal center thereof, the other end of said tray being tapered and having a depending outlet spout projecting from the lower central portion thereof, and a plurality of spaced transverse dish supporting racks rigid with and projecting above the sides of said tray, each rack embodying an inverted U-shaped frame having legs attached to the sides of the tray and an intermediate portion provided with spaced depending rigid bars.

In testimony whereof I affix my signature.

MARY HERTZ.